United States Patent
Onodera et al.

(10) Patent No.: US 7,103,378 B2
(45) Date of Patent: **\*Sep. 5, 2006**

(54) COMMUNICATION SYSTEM

(75) Inventors: Katsuya Onodera, Sagamihara (JP); Nobuaki Kumagai, Yokohama (JP)

(73) Assignee: Victor Company of Japan, Ltd., (JP)

( * ) Notice: Subject to any disclaimer, the term of this patent is extended or adjusted under 35 U.S.C. 154(b) by 1081 days.

This patent is subject to a terminal disclaimer.

(21) Appl. No.: 09/941,387

(22) Filed: Aug. 28, 2001

(65) Prior Publication Data

US 2002/0052997 A1    May 2, 2002

Related U.S. Application Data

(62) Division of application No. 09/033,016, filed on Mar. 2, 1998, now Pat. No. 6,330,441.

(30) Foreign Application Priority Data

Mar. 3, 1997 (JP) .................................. 9-063754
Mar. 14, 1997 (JP) .................................. 9-082196

(51) Int. Cl.
*H04M 1/00* (2006.01)

(52) U.S. Cl. ..................... 455/554.1; 455/555; 455/445

(58) Field of Classification Search ............. 455/426.1, 455/422.1, 455, 459, 436, 561, 511, 461, 455/403, 552.1, 560, 460, 424, 445, 554.1, 455/555, 550.1; 379/231, 232, 234, 198
See application file for complete search history.

(56) References Cited

U.S. PATENT DOCUMENTS

| | | | | |
|---|---|---|---|---|
| 5,781,854 | A * | 7/1998 | Bales | 455/403 |
| 6,151,492 | A * | 11/2000 | Melin | 455/435.3 |
| 6,173,177 | B1 * | 1/2001 | Lu et al. | 455/445 |
| 6,597,912 | B1 * | 7/2003 | Lu et al. | 455/445 |
| 6,831,903 | B1 * | 12/2004 | Kang | 370/328 |
| 2001/0041594 | A1 * | 11/2001 | Arazi et al. | 455/561 |
| 2001/0046214 | A1 * | 11/2001 | Kang | 370/328 |
| 2004/0009749 | A1 * | 1/2004 | Arazi et al. | 455/41.2 |
| 2005/0153743 | A1 * | 7/2005 | Berra et al. | 455/560 |

* cited by examiner

*Primary Examiner*—Sonny Trinh
(74) *Attorney, Agent, or Firm*—Anderson Kill & Olick, PC

(57) ABSTRACT

The communication system 1 comprises the network 70, the circuit controller 10, the ISDN I/F (Integrated Services Network Interface) 20, the PSTN I/F (Private Switched Telephone Network Interface) 30, and the radio base station 40, wherein the circuit controller 10 and the radio base station 40 are connected to the network 70 and communication between mobile radiotelephones 51 through 53 is performed by means of the radio base station 40. Further, the mobile radiotelephone 51 can communicate with other telephone equipment which are connected to the network 70. Furthermore, the mobile radiotelephone 51 can communicate with external telephone equipment which are connected to the analog telephone network 65 or the ISDN network 60 through the PSTN I/F 30 or the ISDN I/F 20. These communication are controlled by the radio base station 40, the circuit controller 10, and terminal equipment such as the ISDN I/F 20 and the PSTN I/F 30.

12 Claims, 8 Drawing Sheets

COMMUNICATION SYSTEM

This application is a divisional application of Ser. No. 09/033,016 filed Mar. 2, 1998 now U.S. Pat. No. 6,330,441 B1.

BACKGROUND OF THE INVENTION

1. Field of the Invention

The present invention relates to a communication system providing voice and data communication services through LAN (Local Area Network) system and relates to a cordless communication system of a private branch exchange (PBX) system wherein plural radio base stations are present in a limited are.

2. Description of the Related Art

Generally, a personal computer which is equipped with a voice processor board and a network I/F (Interface) card is provided for managing a voice communication or a data communication of a PBX (Private Branch eXchange) system within a limited area of one firm location, that is, the voice processor is connected to a PBX switchboard through a telephone line and the voice communication is performed through the PBX switchboard. A wired network system such as LAN (Local Area Network) system is connected to the network I/F card and the data communication is practiced among personal computers connected to the network system. However, in this communication system, a large-scale wiring construction is necessary for the system to connect all personal computers which handle telephones provided for each persons to a telephone network. Furthermore, a massive PBX switchboard is necessary to assign one telephone line per person. Moreover, a telephone conversation is limited within the telephone network, when a voice processor board which is applicable for the telephone network is installed. In any cases, a call can be initiated only by a private line. Therefore, it is impossible to initiate or to answer to a call unless a person is on his private line, although the massive PBX switchboard is equipped or the voice processor board which is suitable for the network is installed.

In addition thereto, mobile radiotelephones such as PHS (Personal Handy-phone System) telephones are used for a communication system of a PBX system wherein the PHS telephones communicate with other telephones through radio base stations. The communication system is used in firms in conjunction with the LAN system. When a PHS telephone is moved from a service area of one radio base station which is hereinafter called an original station to another service area of another radio base station which is hereinafter called a new station, the PHS telephone receives a control signal from the new station and notifies the new station that the PHS telephone can communicate with the new station so that the PHS telephone can not receive a control signal from the original station any more. Service areas of plural radio base stations are assigned for overlapping partially or intentionally assigned to overlap in heavy traffic areas. All communication channels may become busy although plural communication channels which are called an individually assigned slot are provided for one radio base station. In this case, a mobile radiotelephone would not search a control signal from the other radio base station unless the mobile radiotelephone is moved into other service area while the mobile radiotelephone is receiving the control signal from the original station. Therefore, the mobile radiotelephone can not communicate with other radio base stations as far as staying in the same service area when all communication channels of the original station from which the mobile radiotelephone is receiving the control signal are occupied by other radio equipment although some communication channels of another radio base station which can be communicated with the mobile radiotelephone within the same service area are vacant. The mobile radiotelephone is obliged to keep waiting for a vacancy of the communication channel of the original station. Furthermore, the mobile radiotelephone searches the same original station once again and can not communicate with other radio base stations although a power switch of the mobile radiotelephone is turned off and turned on to search another radio base station due to a same process algorithm for searching radio base station.

SUMMARY OF THE INVENTION

Accordingly, an object of the present invention is to provide a communication system which requires a reasonable sized PBX (Private Branch eXchange) switchboard not a massive PBX switchboard and the communication system assures a person of initiating a call or answering a call when he is not on his private line. Further, the communication system assists to communicate with other persons who are out of a network.

In addition thereto, when all communication channels of one radio base station are busy, wherein the radio base station is transmitting control signals to a mobile radiotelephone, the communication system provides a seamless communication by using a communication channel of another radio base station in a same service area whenever the communication channel of the radio base station is vacant.

In order to achieve the above object, the present invention provides, according to an aspect thereof, a radio base station and a circuit controller are connected to a private branch network wherein plural mobile radiotelephones can communicate with each other through the radio base station. Further, in case that telephone equipment are connected to the private branch network, or other telephone equipment are connected to an ISDN (Integrated Services Digital Network) network or an analog telephone network through an ISDN I/F (Interface) or a PSTN I/F (Private Switched Telephone Network Interface), the communication system controls the radio base station and the circuit controller and telephone equipment so that the mobile radiotelephones can communicate with telephone equipment connected to the private branch network or can communicate with other telephone equipment connected to the ISDN network or the analog telephone network.

According to another aspect of the present invention, a communication system is provided. When all communication channels of one radio base station are busy, wherein the one radio base station is transmitting control signals to a mobile radiotelephone, that is, there is no vacant communication channel at all, the control signals from the one radio base station is interrupted. The mobile radiotelephone can use a vacant communication channel of the other radio base station which has a vacant communication channel, wherein the mobile radiotelephone can communicate with the other radio base station through control signals of the other radio base station so that the control signals from the one radio base station is interrupted and the mobile radiotelephone is isolated from the one radio base station.

In more specific aspect of the present invention, there provided a communication system comprising plural radio base stations and a circuit control device. The circuit control device controls the communication system, wherein the circuit control device recognizes usage of respective communication channels of plural radio base stations and directs the radio base stations to start or to stop transmitting control signals of respective radio base stations.

Other objects and further features of the present invention will be apparent from the following detailed description with respect to preferred embodiments of the invention when read in conjunction with the accompanying drawings.

DETAILED DESCRIPTION OF THE PREFERRED EMBODIMENTS

First Embodiment

Figure 1:
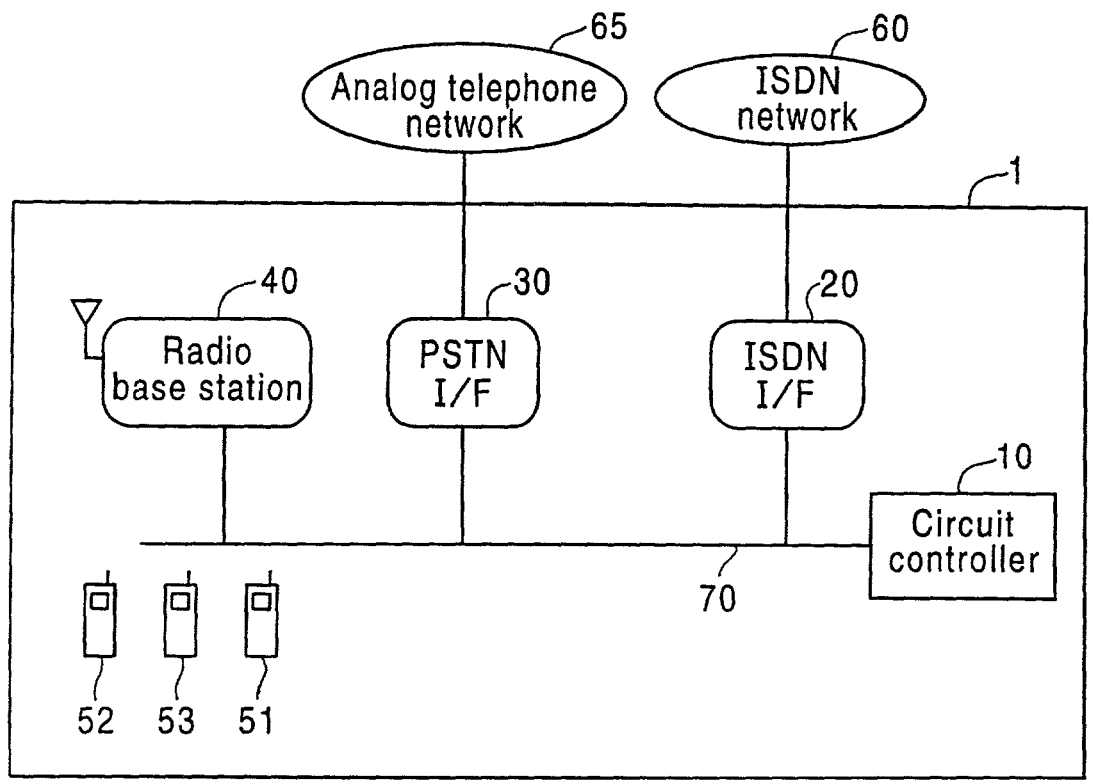
FIG. 1 shows a block diagram of a communication system according to a first embodiment of the present invention.

FIG. 1 is a block diagram of a communication system according to a first embodiment of the present invention.

Figure 2:
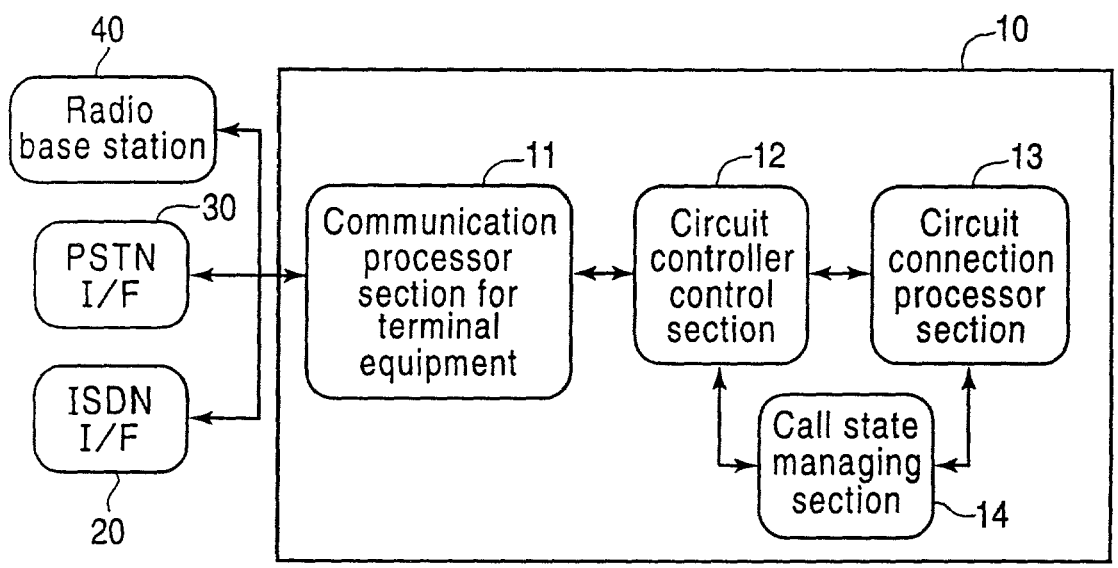
FIG. 2 shows a functional block diagram of a circuit controller shown in FIG. 1.

FIG. 2 is a functional block diagram of a circuit controller shown in FIG. 1.

Figure 3:
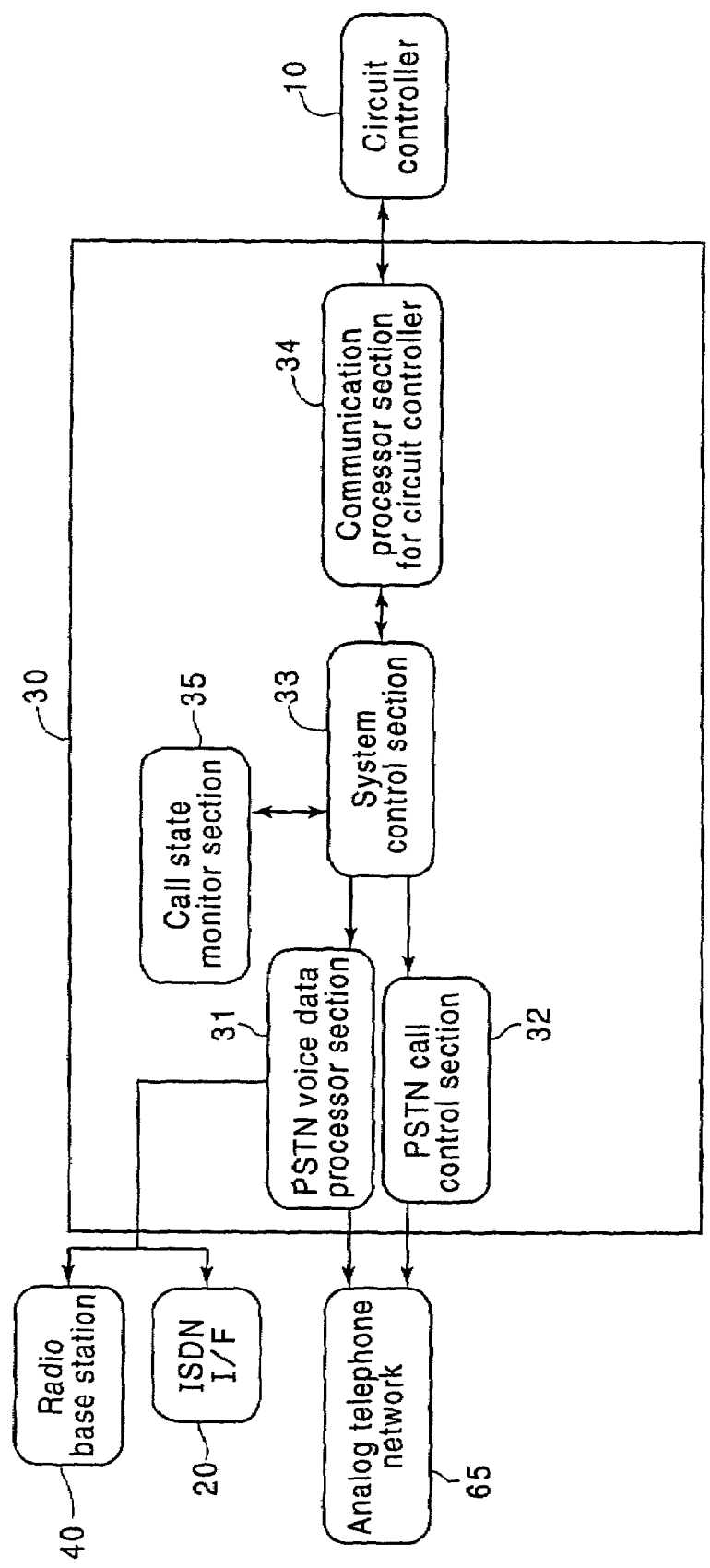
FIG. 3 shows a functional block diagram of a PSTN I/F (Private Switched Telephone Network Interface) shown in FIG. 1.

FIG. 3 is a functional block diagram of a PSTN I/F (Private Switched Telephone Network Interface) shown in FIG. 1.

Figure 4:
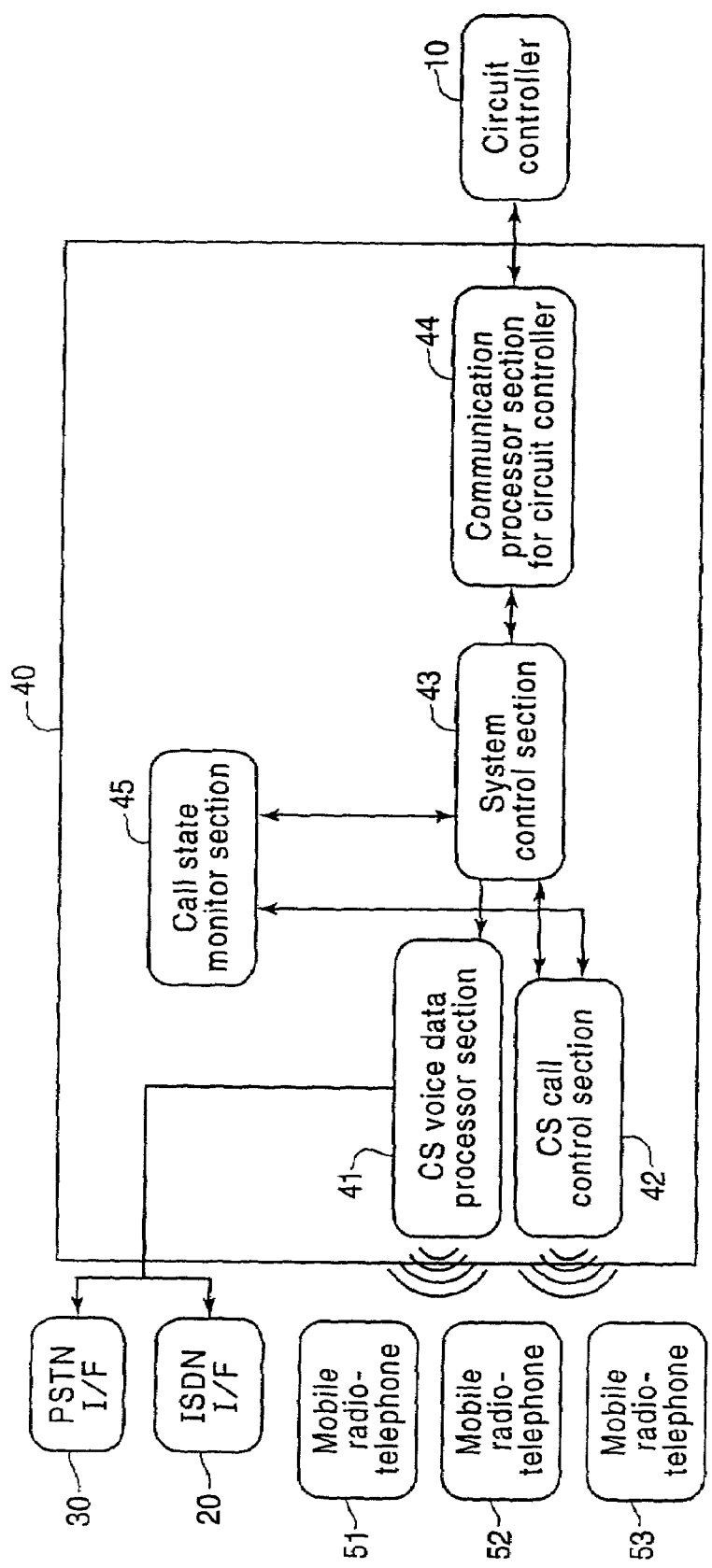
FIG. 4 shows a functional block diagram of a radio base station shown in FIG. 1.

FIG. 4 is a functional block diagram of a radio base station shown in FIG. 1.

Figure 5:
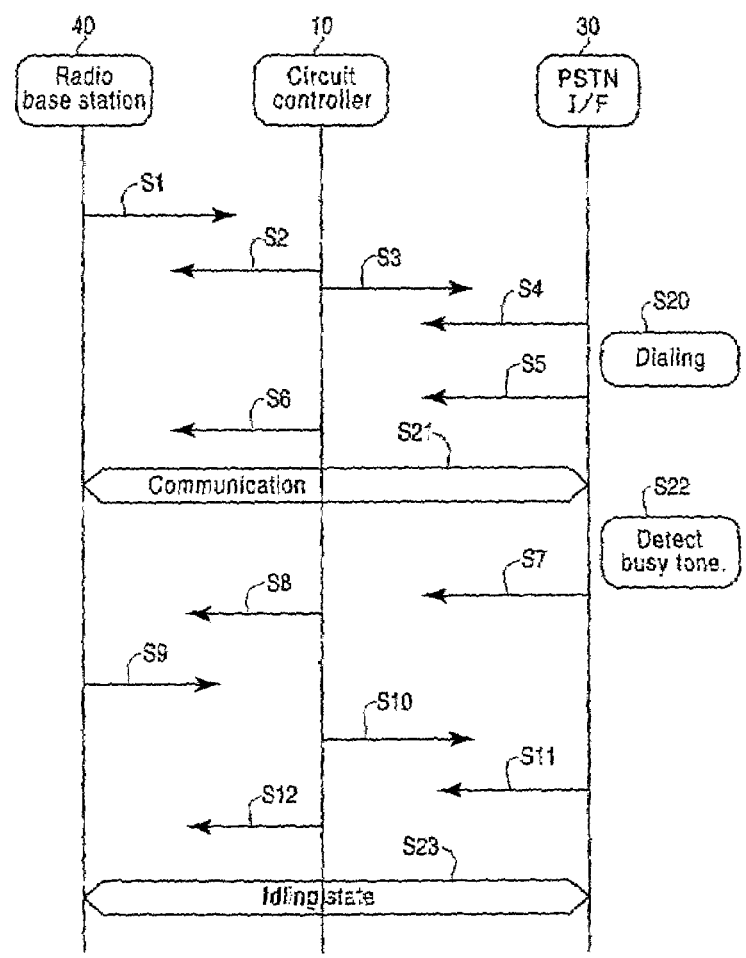
FIG. 5 shows a sequence chart of a process from initiating a call to disconnection of the communication system according to the first embodiment of the present invention.

FIG. 5 is a sequence chart of a process from initiating a call to disconnection of the communication system according to the first embodiment of the present invention.

As shown in FIG. 1, a communication system 1 comprises a network 70 of private branch such as Ethernet or LAN (Local Area Network), a circuit controller 10 connected to the network 70, a radio base station 40 which functions as a base telephone equipment, an ISDN I/F (Integrated Services Digital Network Interface) 20, and a PSTN I/F (Private Switched Telephone Network Interface) 30, wherein the ISDN I/F 20 and the PSTN I/F 30 function as terminal equipment and they are connected to an ISDN network 60 and an analog telephone network 65 which are respectively provided outside of the communication system 1. The ISDN I/F 20 transfers voice data and communication data between the network 70 and the ISDN network 60. On the other hand, the PSTN I/F 30 transfers voice data and communication data between the network 70 and the analog telephone network 65.

The radio base station 40 can communicate with plural mobile radio terminal equipment 51, 52, and 53 which function as a mobile radiotelephone such as a PHS (Personal Handy-phone System) telephone. The mobile radiotelephone 51 hereinafter represents the plural mobile radiotelephones 51, 52, and 53.

As shown in FIG. 2, the circuit controller 10 comprises a communication processor section for terminal equipment 11, a circuit controller control section 12, a circuit connection processor section 13, and a call state managing section 14. The circuit controller 10 manages vacant telephone lines and controls calls such as initiating a call and answering a call. Further, the ISDN I/F 20 and the PSTN I/F 30 and the radio base station 40 are connected to the circuit controller 10 as peripheral devices.

As shown in FIG. 3, the PSTN I/F 30 comprises a PSTN voice data processor section 31, a PSTN call control section 32, a system control section 33, a communication processor section for circuit controller 34, and a call state monitor section 35. Further, the circuit controller 10, the ISDN I/F 20, the radio base station 40, and the analog telephone network 65 are connected to the PSTN I/F 30 as peripheral devices.

As shown in FIG. 4, the radio base station 40 comprises a CS (Cell Station) voice data processor section 41, a CS call control section 42, a system control section 43, a communication processor section for circuit controller 44, and a call state monitor section 45. Further, the circuit controller 10, the ISDN I/F 20, and the PSTN I/F 30 are connected to the radio base station 40 as peripheral devices. Furthermore, the mobile radiotelephone 51 is connected to the CS voice data processor section 41 and the CS call control section 42 with radio communication. Moreover, the radio base station 40 functions as a radio communication interface for the mobile radiotelephone 51 and transfers voice data between the mobile radiotelephone 51 and the ISDN I/F 20 or the PSTN I/F 30.

In addition thereto, all functions which are performed in the circuit controller 10, the PSTN I/F 30, and the radio base station 40 can be realized by devices such as a CPU (Central Processing Unit), a DSP (Digital Signal Processor), a memory device, and a interface. In case that one hundred units of the mobile radiotelephone 51 are dependent on the communication system 1, thirty to thirty five each telephone lines can cover respective telephone line of the network 70 and the PSTN I/F 30 so that the maximum simultaneous operating ratio of one hundred mobile radiotelephones is about 33% in general.

In FIG. 5, a sequence of initiating a call from the mobile radiotelephone 51 to a outside telephone connected to the analog telephone network 65 is depicted in detail. The radio base station 40 transmits "Call setup request" command to the circuit controller 10 (step S1), when the radio base station 40 receives a request for initiating a call from the mobile radiotelephone 51. In the radio base station 40, the CS call control section 42 notifies the call state monitor section 45 of receiving the request for initiating a call from the mobile radiotelephone 51 and at the same time notifies the system control section 43 of a telephone number of the outside telephone and a channel number which is occupied for communication between the mobile radiotelephone 51 and the radio base station 40, when the CS call control section 42 receives the request for initiating a call from the mobile radio equipment 51. Further, the CS call control section 42 includes a control device for call. The call state monitor section 45 notifies the system control section 43 that the CS call control section 42 is in a "request for initiating a call" state. The system control section 43 demands the communication processor section for circuit controller 44 to issue the "Call setup request" command by using the telephone number and the channel number as a parameter and waits for receiving a "Call proceeding" information from the circuit controller 10. The communication processor section for circuit controller 44 composes a "Call setup request" command and transmits it to the circuit controller 10 on the network 70.

The circuit controller 10 searches a vacant PSTN telephone line and controls a call between the radio base station 40 and the PSTN I/F 30, when the circuit controller 10 receives the "Call setup request" command from the radio base station 40. The communication processor section for terminal equipment 11 notifies the circuit controller control section 12 of receiving the "Call setup request" command, when the circuit controller control section 12 receives the "Call setup request" command from the radio base station 40. The circuit controller control section 12 notifies the circuit connection processor section 13 of a terminal number of the mobile radiotelephone 51 and the telephone number to be connected. The circuit connection processor section 13 makes access to the call state managing section 14 for searching whether a vacant line is available or not. The call state managing section 14 sends an available terminal ID (IDentification) number back to the circuit connection processor section 13 whenever the circuit connection processor section 13 makes access to the call state managing section 14, wherein the call state managing section 14 is always monitoring call state of each telephone connected to the network 70. The circuit connection processor section 13 demands the circuit controller control section 12 to issue a "Call proceeding" command to the radio base station 40 when the circuit controller control section 13 finds an available terminal, and demands the PSTN I/F 30 to issue a "Call setup request" command. The communication processor section for terminal equipment 11 composes the "Call proceeding" command and transmits it to the radio base station 40 (step S2), and also composes the "Call setup request" command and transmits it to the PSTN I/F 30 (step S3). Thus the circuit controller control section 12 and the circuit connection processor section 13 and the call state managing section 14 are comprising communication control devices which manage a communication path between the radio base station 40 and the PSTN I/F 30.

When the radio base station 40 receives the "Call proceeding" command transferred from the circuit controller 10 (step S2), the radio base station 40 further transfers voice data which will be transferred from the PSTN I/F 30 to the mobile radiotelephone 51. The communication processor section for circuit controller 44 notifies the system control section 43 of receiving the "Call proceeding" command. The system control section 43 extracts the telephone number of the outside telephone and the channel number between the radio base station 40 and the mobile radiotelephone 51 from the "Call proceeding" command and instructs the CS voice data processor section 41 to start voice transfer to the PSTN I/F 30. The system control section 43 notifies the CS call control section 42 of a state of "Waiting for connection". The CS voice data processor section 41 transfers voice data from the PSTN I/F 30 to the mobile radiotelephone 51 and transfers voice data from the mobile radiotelephone 51 to the PSTN I/F 30, when the CS voice data processor section 41 is demanded to start voice transfer by the system control section 43. The CS call control section 42 notifies the call state monitor section 45 of a current state of "Waiting for connection".

The PSTN I/F 30 initiates a call to the analog telephone network 65 when the PSTN I/F 30 receives the "Call setup request" command (step S3), and the PSTN I/F 30 sends a "Call proceeding" command to the circuit controller 10 (step S4). The PSTN I/F 30 starts to transfer voice data to the radio base station 40 while waiting for an answer back from the analog telephone network 65. The communication processor section for circuit controller 34 notifies the system control section 33 of receiving a "Notice of call setup request" from the circuit controller 10. The system control section 33 calls the call state monitor section 35 for an availability of a vacant line. In case that a vacant line is available, the system control section 33 extracts the telephone number of the outside telephone and demands the PSTN call control section 32 to initiate a call. When the PSTN call control section 32 is demanded to initiate a call by the system control section 33, the PSTN call control section 32 transmits a dial of the telephone number (step S20) after a dial tone from the analog telephone network 65 is detected, wherein the dial is a signal which indicates the telephone number and this kind of signal is hereinafter called a dial. Further, the PSTN control section 32 notifies the call state monitor section 35 of being transmitting the dial. The call state monitor section 35 notifies the system control section 33 of being transmitting the dial, when the PSTN call control section 32 starts to transmit the dial. The system control section 33 demands the communication processor section for circuit controller 34 to issue a "Notice of call proceeding". The communication processor section for circuit controller 34 composes a "Call proceeding" command and transmits the "Call proceeding" command to the circuit controller 10.

The PSTN I/F 30 starts to transmit voice data to the analog telephone network 65 when the dial transmission from the PSTN I/F 30 to the analog telephone network 65 is completed. The PSTN call control section 32 notifies the call state monitor section 35 of completing the dial transmission. The call state monitor section 35 notifies the system control section 33 of being in a state of "Waiting for connection" when the PSTN call control section 32 is in the state of "Waiting for connection" after the completion of the dial transmission. The system control section 33 demands the PSTN voice data processor section 31 to transfer voice data. The PSTN voice data processor section 31 starts to transfer voice data from the analog telephone network 65 to the radio base station 40 and transfer voice data from the radio base station 40 to the analog telephone network 65. The PSTN voice data processor section 31 and aforementioned CS voice data processor section 41 comprise a voice data processor device and they process to transfer voice data directly without any demand from the circuit controller 10 once the mobile radiotelephone 51 is connected to the analog telephone network 65 by the demand of the circuit controller 10.

The PSTN I/F 30 transmits a "Connection notice" to the circuit controller 10 (step S5) when the PSTN I/F 30 receives the "Connection notice" from the analog telephone network 65. The PSTN call control section 32 waits for that polarity of the analog telephone network 65 is reversed after the dial transmission is completed. The PSTN call control section 32 notifies the call state monitor section 35 of completing a connection when the PSTN call control section 32 detects reversed polarity of the analog telephone network 65. The call state monitor section 35 notifies the system control section 33 of being in a state of completion of connection when the PSTN call control section 32 is in a complete connection state. The system control section 33 directs communication processor section for circuit controller 34 of issuing a "Connection notice". The communication processor section for circuit controller 34 composes the "Connection notice" and issues the "Connection notice" to the circuit controller 10.

The circuit controller 10 transfers the "Connection notice" to the radio base station 40 (step S6) when the circuit controller 10 receives the "Connection notice" from the PSTN I/F 30. The communication processor section for terminal equipment 11 notifies the circuit controller control section 12 of receiving the "Connection notice". The circuit controller control section 12 extracts the terminal ID number of the mobile radiotelephone 51 from a command and notifies the circuit connection processor section 13 of completing transmission of the terminal number. The circuit connection processor section 13 demands the circuit controller control section 12 to direct the radio base station 40 of issuing a "Connection notice". The circuit controller control section 12 directs the communication processor section for terminal equipment 11 to issue the "Connection notice". The communication processor section for terminal equipment 11 composes the "Connection notice" and issues it to the radio base station 40.

The radio base station 40 completes a call control when the radio base station 40 receives the "Connection notice" (step S6). The communication processor for circuit controller 44 notifies the system control section 43 of receiving the "Connection notice". The system control section 43 notifies the CS call control section 42 of completing the call control. Further, the system control section 43 directs the CS voice data processor section 41 to transfer voice data. The CS voice data processor section 41 starts to transfer voice data from the mobile radiotelephone 51 to the PSTN I/F 30 and also transfers voice data from the PSTN I/F 30 to the mobile radiotelephone 51. Then the sequence is in a communication state (step S21).

The PSTN I/F 30 transmits a "Disconnection request" command to the circuit controller 10 (step S7) when the PSTN I/F 30 detects a busy tone from the analog telephone network 65 (step S22), wherein the busy tone is emitted from the analog telephone network 65 when the outside telephone is hung up. The PSTN call control section 32 notifies the call state monitor section 35 of detecting the busy tone from the analog telephone network 65. The call state monitor section 35 notifies the system control section 33 that the PSTN call control section 32 is in a disconnection state. The system control section 33 directs the communication processor section for circuit controller 34 to issue the "Disconnection request" command. The communication processor section for circuit controller 34 composes the "Disconnection request" command and transmits it to the circuit controller 10.

The circuit controller 10 transfers a "Disconnection request" command to the radio base station 40 (step S8) when the circuit controller 10 received the "Disconnection request" command from the PSTN I/F 30 (step S7). The communication processor section for terminal equipment 11 notifies the circuit controller control section 12 of receiving the "Disconnection request" command from the PSTN I/F 30. The circuit controller control section 12 judges which telephone connected to the analog telephone network 65 emitted the "Disconnection request" command and notifies the circuit connection processor section 13 of a telephone number which emitted the "Disconnection request" command. The circuit connection processor section 13 directs the communication processor section for terminal equipment 11 two issue the "Disconnection request" command to the radio base station 40. The communication processor section for terminal equipment 11 composes the "Disconnection request" command and transmits it to the radio base station 40.

The radio base station 40 opens a radio link between the radio base station 40 and the mobile radiotelephone 51 and transmits a "Release request" command to the circuit controller 10 (step S9) when the radio base station 40 receives the "Disconnection request" command (step S8). The communication processor section for circuit controller 44 notifies the system control section 43 of receiving the "Disconnection request" command from the circuit controller 10. The system control section 43 directs the CS call control section 42 to open the radio link. The CS call control section 42 opens the radio link with the mobile radiotelephone 51 and notifies the call state monitor section 45 of opening the radio link. The call state monitor section 45 notifies the system control section 43 of opening the radio link between the radio base station 40 and the mobile radiotelephone 51 when the radio link is opened. The system control section 43 directs the communication processor section for circuit controller 44 to issue the "Release request" command. The communication processor section for circuit controller 44 composes the "Release request" command and transmits it to the circuit controller 10 (step S9).

The circuit controller 10 transfers the "Release request" command to the PSTN I/F 30 (step S10) when the circuit controller 10 receives the "Release request" command from the radio base station 40 (step S9). The communication processor section for terminal equipment 11 notifies the circuit controller control section 12 of receiving the "Release request" command. The circuit controller control section 12 judges which mobile radiotelephone emitted the "Release request" command and notifies the circuit connection processor section 13 of the terminal ID number. The circuit connection processor section 13 directs the communication processor for terminal equipment 11 to issue the "Release request" command to the PSTN I/F 30. The communication processor section for terminal equipment 11 composes the "Release request" command and transmits the "Release request" command to the PSTN I/F 30 (step S10).

The PSTN I/F 30 opens a circuit to the analog telephone network 65 and sends a "Release complete notice" back to the circuit controller 10 (step S11). The communication processor section for circuit controller 34 notifies the system control section 33 of receiving the "Release complete notice" from the PSTN I/F 30. The system control section 33 directs the PSTN call control section 32 to open the circuit to the analog telephone network 65. The PSTN call control section 32 opens the circuit and notifies the call state monitor section 35 of opening the circuit. The call state monitor section 35 notifies the system control section 33 that the circuit between the PSTN I/F 30 and the analog telephone network 65 is in a open circuit state. The system control section 33 directs the communication processor section for circuit controller 34 to issue the "Release complete notice". The communication processor section for circuit controller 34 composes the "Release complete notice" and transmits it to the circuit controller 10 (step S11). Further, the system control section 33 directs the PSTN voice data processor section 31 to interrupt a transmission of voice data. The PSTN voice data processor section 31 stops transmitting voice data to the radio base station 40.

The circuit controller 10 transfers the "Release complete notice" to the radio base station 40 (step S12) when the "Release complete notice" is transferred from the PSTN I/F 30 (Step S11). The communication processor section for terminal equipment 11 notifies the circuit controller control section 12 of receiving the "Release complete notice". The circuit controller control section 12 judges which telephone emitted the "Release complete notice" and notifies the circuit connection processor section 13 of the telephone number. The circuit connection processor section 13 directs the communication processor section for terminal equipment 11 to issue the "Release complete notice" to the radio base station 40. The communication processor section for terminal equipment 11 composes the "Release complete notice" and transmits it to the radio base station 40 (step S12).

The radio base station 40 completes a call control when the radio base station 40 receives the "Release complete notice" (step S12). The communication processor section for circuit controller 44 notifies the system control section 43 of receiving the "Release complete notice" from the circuit controller 10 (step 12). The system control section 43 completes the call control. Then the sequence is in an idling state (step S23).

It is possible to communicate by using the ISDN network 60 instead of the analog telephone network 65 although above mentioned explanation is communication through the analog telephone network 65. Above mentioned explanation mentions about communication between the mobile radiotelephone 51 and an external telephone connected to the analog telephone network 65. However, in case of private branch communication such as communication between the mobile radiotelephone 51 and the mobile radiotelephone 52, the ISDN I/F 20 and the PSTN I/F 30 are not necessary. In this case, it is possible to communicate by control of the radio base station 40 and the circuit controller 10. Further, communication between the mobile radiotelephone 51 and a telephone connected to the network 70 is feasible.

In addition thereto, the first embodiment discloses the communication system of transmitting or receiving voice data of conversation between two persons. Basically a PHS (Personal Handy-phone System) telephone as a mobile radiotelephone is one of digital communication equipment. The PHS telephone can transmit or receive not only voice data in digital signal but also digital signals such as computer data and the PHS telephone possesses a data communication function. Therefore, data communication between a PHS telephone and a device connected to the network 70 or the ISDN telephone network 60 can be performed by using a conversion device for data communication protocol when data other than voice data are transmitted form the PHS telephone, wherein the converter device is necessary to be provided for either the radio base station 40 or the circuit controller 10, or the converter device is necessary to be connected to the network 70 as a stand-alone device.

While the invention has been described above with reference to specific embodiments thereof, it is apparent that many changes, modifications and variations in the arrangement of equipment and devices can be made without departing from the inventive concept disclosed herein. For example, plural radio base station can be connected to the network 70 for utilizing plural mobile radiotelephone in one communication system.

Accordingly, the communication system described in the above mentioned first embodiment provides a private branch cordless telephone system which comprises a radio base station and a circuit controller connected to a private branch network. It is possible to communicate between two mobile radiotelephones out of plural mobile radiotelephones linked to the private branch cordless telephone system by means of the radio base station. The private branch cordless telephone system does not require a large-scale wiring construction for telephone lines nor a expensive PBX (Private Branch eXchange) switchboard. Further, there is provided a communication system in which individual persons can communicate with an internal or an external person by using a mobile radiotelephone supplied to them even though they are not at their own desks. Furthermore, there provided cordless telephone surroundings such as one cordless telephone per person basis in accordance with frequency in use of telephones so that a large number of mobile radiotelephones more than a number of outgoing telephone lines can be used in the communication system.

Second Embodiment

Figure 6:
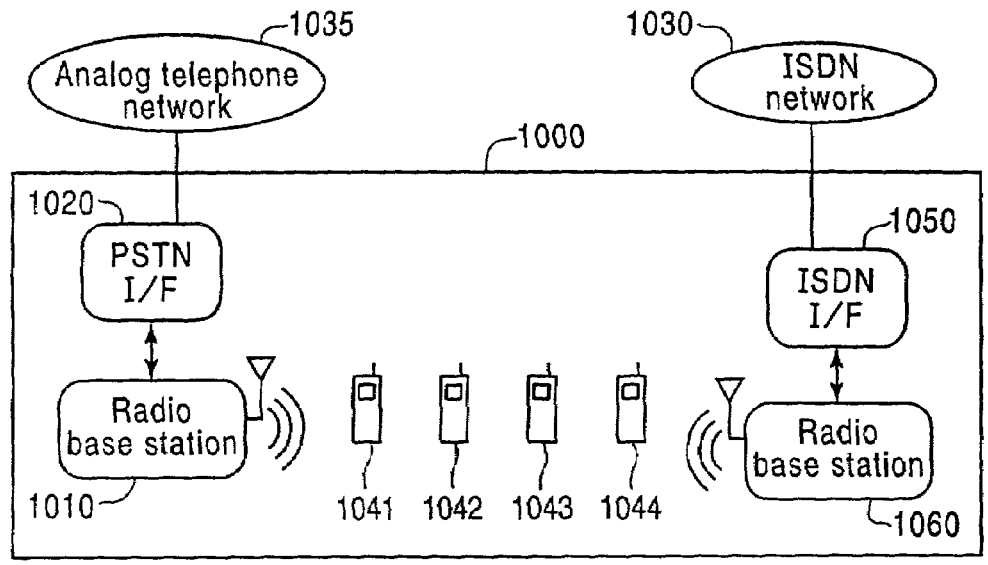
FIG. 6 shows a block diagram of a communication system according to a second embodiment of the present invention.

FIG. 6 is a block diagram of a communication system according to a second embodiment of the present invention.

Figure 7:
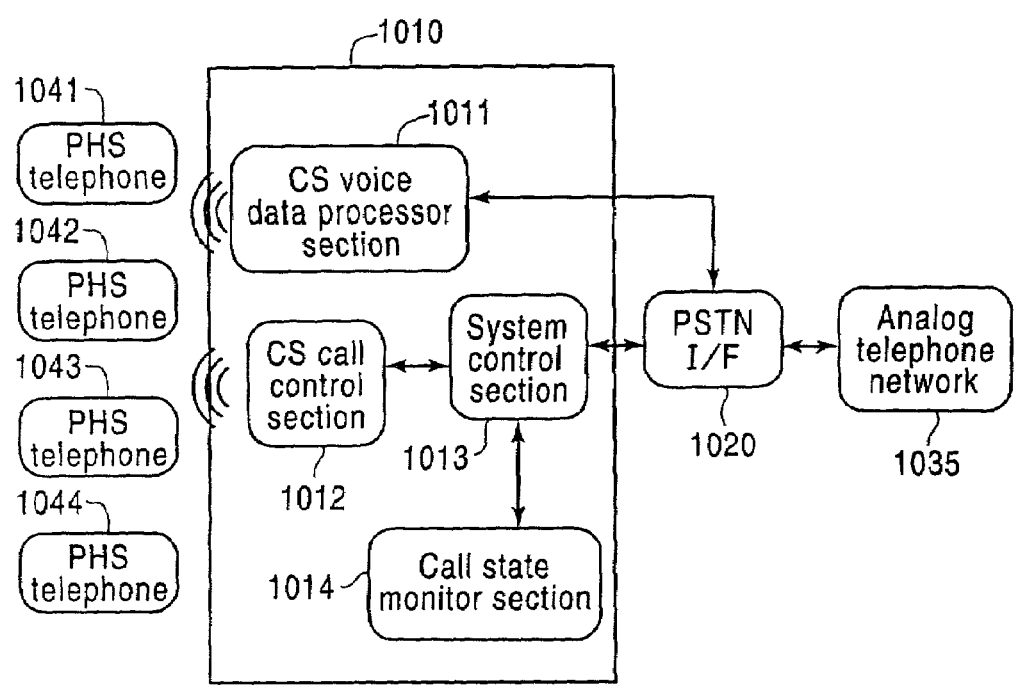
FIG. 7 shows a functional block diagram of a radio base station shown in FIG. 6.

FIG. 7 is a functional block diagram of a radio base station shown in FIG. 6.

Figure 8:
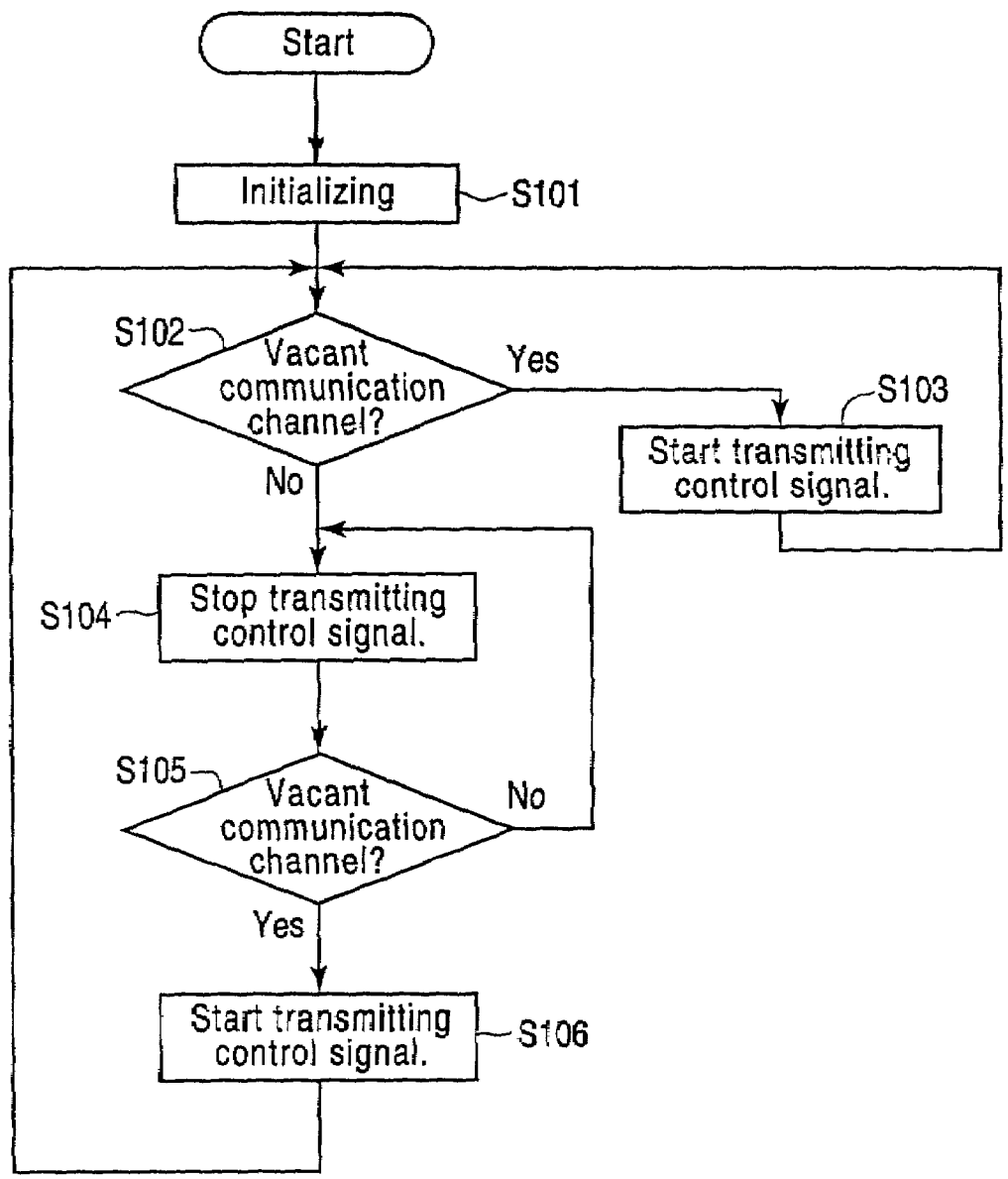
FIG. 8 shows a process flow chart of the radio base station shown in FIG. 6.

FIG. 8 is a process flow chart of the radio base station shown in FIG. 6.

As shown in FIG. 6, a communication system 1000 comprises two radio base stations 1010 and 1060. These radio base stations 1010 and 1060 can communicate with plural mobile radiotelephones 1041, 1042, 1043, and 1044 in the communication system 1000, wherein the radio base stations 1010 and 1060 function as a cell station (CS) as well as a base station. A PSTN I/F (Private Switched Telephone Network interface) 1020 and an ISDN I/F (Integrated Services Digital Network Interface) 1050 are connected to the radio base stations 1010 and 1060 respectively. The PSTN I/F 1020 is connected to an analog telephone network 1035 and transfers voice data to the analog telephone network 1035 or to the radio base station 1010. The ISDN I/F 1050 is connected to an ISDN network 1030 and transfer voice data and communication data to the ISDN network 1050 or to the radio base station 1060.

Following conditions are hereinafter applied for the description of the second embodiment of the present invention. A PHS (Personal Handy-phone System) telephone is used for the mobile radiotelephones 1041, 1042, 1043, and 1044. Service areas of the radio base stations 1010 and 1060 are overlapping each other or cover almost same area. Communication between the radio base stations and the mobile radiotelephones is performed in a same radio frequency band and is processed with the TDMA-TDD (Time Division Multiple Access—Time Division Duplex) system. Number of communication channels is 3. One frame of the TDMA-TDD comprises 4 transmission slots and 4 reception slots, wherein one frame is equivalent to 5 ms (millisecond) and one slot is equivalent to 625 µs (microsecond). One slot out of 4 slots is a control slot including control signals and is common to all channels, and the other 3 slots are communication slots or individually assigned slots which are individually assigned for individual communication with 3 mobile radiotelephones.

As shown in FIG. 7, the radio base station 1010 comprises a CS voice data processor section 1011, a CS call control section 1012, a system control section 1013, and a call state monitor section 1014. The call state monitor section 1014 monitors and recognizes a communication channel of the radio base station 1010. Each section of the radio base station 1010 can be composed by devices such as a CPU (Central Processor Unit), a DSP (Digital Signal Processor), memory device, and an interface.

The CS call control section 1012 notifies the system control section 1013 of telephone number and a channel number, when the CS call control section 1012 receives a "Call request" command from the PHS telephone 1041. The system control section 1013 directs the CS voice data processor section 1011 to start voice transfer to the PSTN I/F 1020, when the analog telephone network 1035 is connected through the PSTN I/F 1020. The system control section 1013 notifies the CS call control section 1012 of being in a "Waiting for connection" state. The CS voice data processor section 1011 transfers voice data from the PSTN I/F 1020 to the PHS telephone 1041 and transfers voice data from the PHS telephone 1041 to the PSTN I/F 1020, when the CS voice data processor section 1011 is directed to start voice transfer by the system control section 1013.

The call state monitor section 1014 has a function of monitoring usage of communication channels. With assuming that PHS telephones 1041 and 1042 are communicating with the radio base station 1010, that is, 2 communication channels out of 3 communication channels of the radio base station 1010 are occupied and one communication channel is vacant, the call state monitor section 1014 notifies the system control section 1013 that all communication channels or individually assigned slots are occupied and no vacant channel or slot is left, when the PHS telephone 1043 initiated a call and the the call state monitor section 1014 detected that the communication channel is in use. The system control section 1013 directs the CS call control section 1012 to stop transmitting control signals. The CS call control section 1012 stops transmitting control signals after the CS call control section 1012 confirmed that all communication channels were busy.

In FIG. 8, a process of the radio base station 1010 is depicted in detail. The radio base station 1010 initializes memory devices and buffers (step S101) and judges whether a vacant communication channel is available or not (step S102). With assuming that number of communication channels of the radio base station 1010 is 3 and the PHS telephones 1041 and 1042 are communicating with the radio base station 1010, two communication channels are occupied and one communication channel is vacant.

In the above mentioned state, it is judged in the step S102 that one communication channel is available. The CS call control section 1012 starts transmitting control signals (step S103) and it returns back to the step S102, wherein the CS call control section 1012 keeps transmitting the control signals when the CS call control section 1012 is transmitting the control signals. In case that all communication channels are occupied, the CS call control section 1012 stops transmitting the control signals (step S104). The system control section 1013 judges whether a vacant channel is available or not (step S105). In case that a vacant communication channel is available, the CS call control section 1012 transmits the control signals (step S106) and it returns back to step S102. In case that all communication channels are occupied, it returns back to the step S104 and the CS call control section 1012 stops transmitting the control signals. In addition thereto, a PHS telephone can communicate with another PHS telephone when they are set in a transceiver mode although all communication channels of a radio base station are occupied.

The above mentioned process is related to the radio base station 1010. However, a process of the other radio base station 1060 is the same as that of the radio base station 1010. In case that some communication channels of both radio base stations 1010 and 1060 are vacant, control signals are transmitted from respective radio base stations 1010 and 1060. However, since PHS telephones 1041, 1042, 1043, and 1044 search for a radio base station with a predetermined algorithm, priority is given to a radio base station which is recognized first or a radio base station of which code number is low when control signals from the radio base stations are received simultaneously.

Accordingly, the communication system 1000 has been described above is not equipped with a circuit controller. However, each radio base station effectively stops transmitting control signals when all communication channels of each radio base station are occupied, since each radio base station is equipped with a function of stopping transmitting control signals. Therefore, each mobile radio terminal equipment can receive control signals from another radio base station and start to communicate with a vacant communication channel of another radio base station.

While the invention has been described above with reference to specific embodiments thereof, it is apparent that many changes, modifications and variations in the arrangement of equipment and devices can be made without departing from the inventive concept disclosed herein. For example, a private branch network such as Ethernet which is a typical network system of LAN (Local Area Network) system can be connected to the communication system 1000 for utilizing plural wired telephones and computer systems.

Third Embodiment

Figure 9:
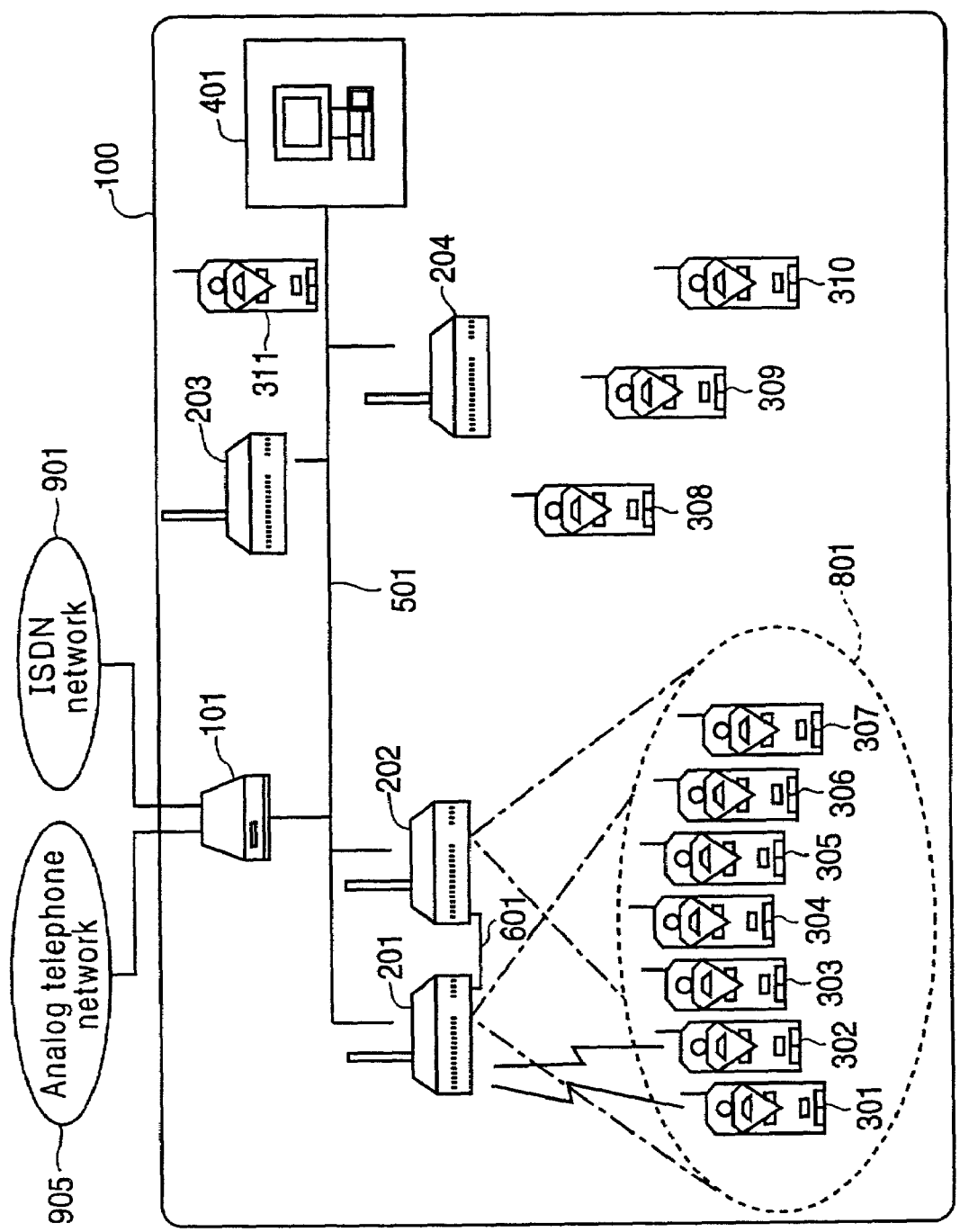
FIG. 9 shows a block diagram of a communication system according to a third embodiment of the present invention.

FIG. 9 is a block diagram of a communication system according to a third embodiment of the present invention.

Figure 10:
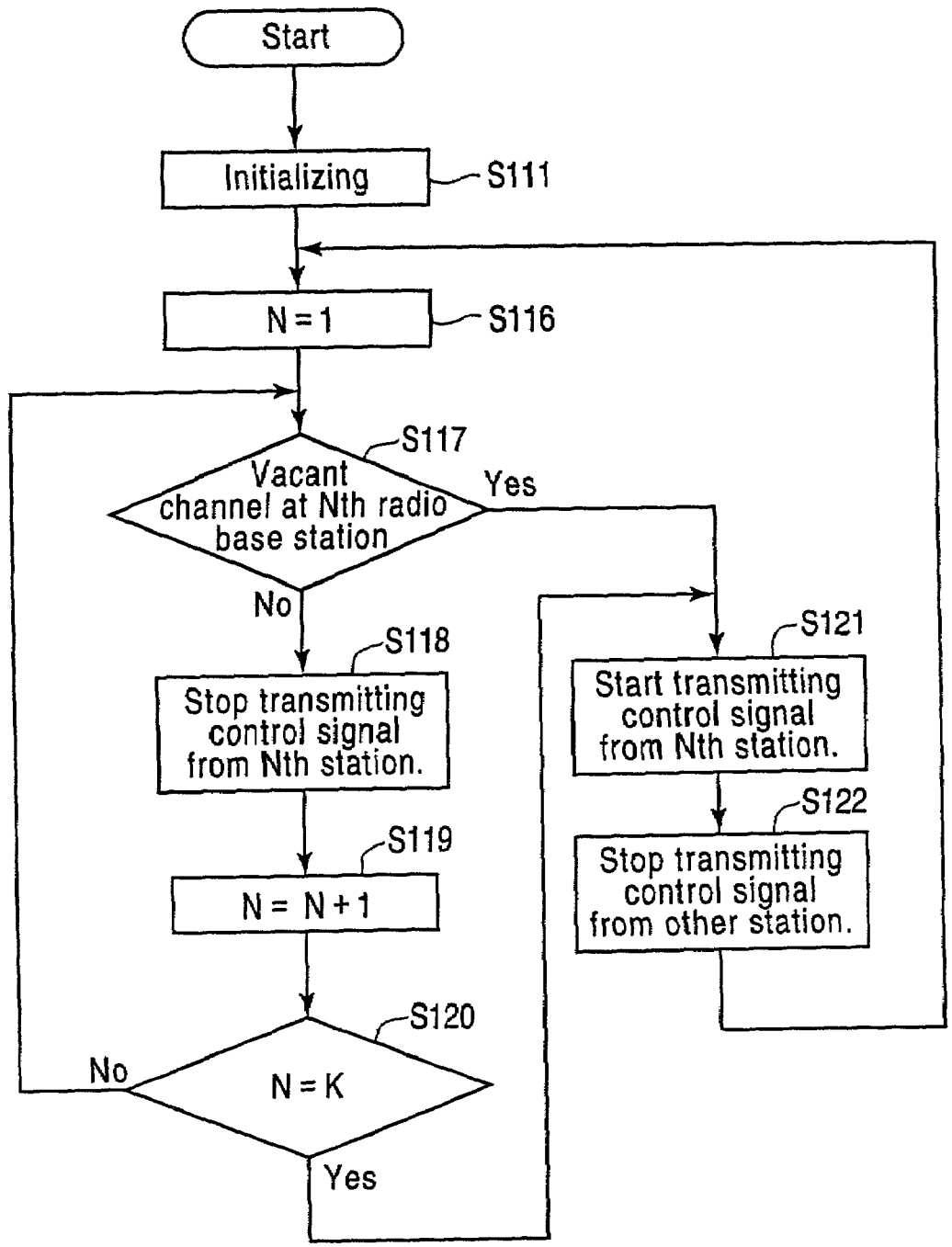
FIG. 10 shows a process flow chart of a radio base station shown in FIG. 9.

FIG. 10 is a process flow chart of a radio base station shown in FIG. 9.

As shown in FIG. 9, a communication system 100 comprises a LAN (Local Area Network) network 501, radio base stations 201 through 204 which function as a cell station (CS) or a base station, a circuit control device 401 which functions as a circuit controller, and plural mobile radiotelephones 301 through 311 as a mobile radio terminal equipment. The radio base stations 201 through 204 and the circuit control device 401 are connected to the LAN network 501. Further the LAN network 501 is connected to an ISDN (Integrated Services Digital Network) network 901 and an analog telephone network 905 through a terminal equipment 101. The circuit control device 401 controls the radio base stations 201 through 204 to switch a circuit for each radio base station. A service area of the radio base station 201 and that of the radio base station 202 cover almost same service area 801. A radio frequency band of the radio base station 201 and that of the radio base station 202 are the same. These radio base stations 201 and 202 can communicate with plural mobile radiotelephones in the service area 801. A configuration of the radio base stations 201 and 202 is basically the same as that of the radio base station described in the second embodiment of the present invention. However, the circuit control device 401 recognizes usage of communication channels and controls control signals of the radio base station 201 or the radio base station 202 to transmit or to stop transmitting.

In FIG. 9, the communication system 100 is depicted in detail with assuming following conditions. A PHS (Personal Handy-phone System) telephone is used for the mobile raidiotelephone. Seven PHS telephones 301 through 307 are present in the service area 801 and the other PHS telephones 308 through 311 are present outside of the service area 801. Communication between the radio base station 201 or 202 and the PHS telephones 301 through 307 is performed in a same radio frequency band and is processed with the TDMA-TDD (Time Division Multiple Access—Time Division Duplex) system. Number of communication channels is 3.

The respective radio base stations 201 through 204 can transmit control signals to its service area. To start or to stop transmitting control signals of a radio base station is controlled by the circuit control device 401. A device which has a function of controlling control signals of the radio base stations 201 through 204 can be connected to the LAN network 501 besides the circuit control device 401 as a variation in the arrangement of equipment or devices. The respective radio base stations 201 through 204 performs call control such as a call initiated from a PHS telephone or a call present to the PHS telephone which is present in its service area through the LAN network 501 under the control of the circuit control device 401. The respective radio base stations 201 through 204 has 3 communication channels as explained above. Two out of 3 communication channels of the radio base station 201 are supposed to be occupied, the radio base station 201 transmits control signals. In case that all communication channels of the radio base station 201 are occupied, the radio base station 201 can not communicate with a PHS telephone any more so that it stops transmitting control signals. Other radio base stations which have vacant communication channels transmit control signals.

As shown in FIG. 10, a process of a CPU (Central Processing Unit) which configurates a part of the circuit control device 401 is depicted in detail. Memory devices and buffers of the circuit control device 401 are initialized (step S111). Numbers of count N of a pre-installed counter is set to one (step S116). The number N is an inherent number which specifies individual radio base stations, in this case, N=1 indicates the radio base station 201 and N=2 indicates the radio base station 202. It judges whether a Nth radio base station has a vacant communication channel or not (step S117). In case that the PHS telephones 301 and 302 are communicating with the radio base station 201, two communication channels of the radio base station 201 are occupied and one communication channel is vacant.

In the above mentioned case, it is judged that there is a vacant communication channel in the step S117. The Nth radio base station, that is, the radio base station 201 is started to transmit control signals (step S121), wherein the radio base station 201 keeps transmitting control signals when the radio base station 201 is transmitting control signals. Then other radio base stations are stopped transmitting control signals (step S122) and it returns back to the step S116. In case that it is judged as no vacant communication channels in the step S117, control signals from the Nth radio base station is stopped transmitting (step S118). When the PHS telephones 301 through 303 are communicating with the radio base station 201, all 3 communication channels are occupied, that is, there is no vacant communication channels. The number N is incrementally advanced by one (step S119).

It is judged whether the number N reaches a predetermined number K or not (step S120), wherein the number K is a number of the radio base stations of which service areas are the same service area or are overlapping each other. In this case, the number K is 2 so that the step S120 becomes "Yes" when the number N is defined as 2 in the step S119. The Nth radio base station is defined as the radio base station 202 in the step S121 and control signals are transmitted from the radio base station 202. Therefore, the radio base station 202 is used for communication when the PHS telephone 304 initiates a call. In addition thereto, in case that the number K is more than 3, the step S121 is carried out through the step S117 or the step S120.

Accordingly, a timing between stopping transmitting control signals from one radio base station and starting to transmit control signals from the other radio base station is synchronized. This synchronization is feasible to control simultaneously radio base stations of which service areas cover same area by the circuit control device 401. For example, as shown in FIG. 9, a signal line 601 which transmits or receives a synchronous signal is connected between the radio base station 201 and the radio base station 202 so that a timing of stopping transmitting control signals from one radio base station can synchronize with a timing of starting to transmit control signals from the other radio base station.

In addition thereto, control of the radio base stations 201 and 202 which share the service area 801 has been described above. However, in case that the radio base stations 203 and 204 which have other service areas than the service area 801 are connected to the LAN network 501 as shown in FIG. 9, the circuit control device 401 previously specifies radio base stations which share almost all the same service area and is necessary to register the radio base stations. Therefore, the memory device of the circuit control device 401 is registered with new information about which radio base stations share same service area when new radio base stations are installed or new private branch network is built up. In the third embodiment described above, the radio base stations 201 and 202 are registered to the circuit control device 401 and the process shown in FIG. 10 is applied to the radio base stations 201 and 202.

Further, to start or to stop transmission of control signals is controlled by the same process as shown in FIG. 10 explained above, therefore the PHS telephones 301 through 307 can immediately communicate with one radio base station when all communication channels of the other radio base station are fully occupied. Each radio base station has function of transmitting control signals. However, it is controlled by the circuit control device 401 that one of plural radio base stations transmits control signals at the same time. The circuit control device 401 controls plural radio base stations to start or to stop transmitting control signals in accordance with recognizing usage of communication channels or individually assigned communication slots of plural radio base stations.

The PHS telephone 307 can not start communicating with either radio base station 201 or 202 when the PHS telephones 301 through 303 are communicating with the radio base station 201 and further the PHS telephones 304 through 306 are communicating with the radio base station 202, that is, all of individually assigned communication slots are fully occupied. In the step S121, a radio base station of greatest N, in this case the radio base station 202, is controlled to keep transmitting the control signals although all communication channels of the radio base station 202 are occupied. Therefore, the PHS telephone 307 can recognize by the control signals from the radio base station 202 that all communication channels are busy, when the PHS telephone 307 is initiated to call. When all communication channels of all radio base stations in a same service area are in use and individually assigned slots are fully occupied, if transmission of all control signals from all radio base stations are stopped transmitting, it makes confusion that a display of a PHS telephone indicates "Out of service area" even though the PHS telephone is still in the service area.

Following process will follow with assuming that all communication channels of all radio base stations, in this case the radio base stations 201 and 202, are occupied then at least one communication channel of the radio base station 201 becomes vacant. In the step S117, the vacant communication channel is recognized. Transmission of control signals of the radio base station 201 is started in the step S121 and transmission of control signals of the radio base station 202 is stopped in the step S122. The PHS telephone 307 can communicate through the radio base station 201 when the PHS telephone 307 is initiated to call since the PHS telephone 307 can receive the control signals from the radio base station 201 under the above mentioned condition.

Furthermore, the circuit control device 401 controls to switch transmission of control signals over to the radio base station 202 from the radio base station 201 when all communication channels of the radio base station 201 are occupied while the radio base station 201 is transmitting control signals. However, it is possible to switch transmission of control signals over to other radio base stations in accordance with predetermined conditions which are based on usage frequency of each radio base station and usage ratio of communication channels although all communication channels are not fully occupied. Moreover, the third embodiment of the present invention described above is systematized so as to communicate with external terminal equipment outside of the communication system 100. However, the communication system of the present invention further provides an internal communication between mobile radiotelephones in a private branch network, although the communication system comprises only private branch network.

While the invention has been described above with reference to specific embodiments thereof, it is apparent that many changes, modifications and variations in the arrangement of equipment and devices can be made without departing from the invention concept disclosed herein. For example, number of communication channels of a radio base station is defined as 3. However, more than 3 can be assigned for the number of communication channels. Further, each mobile radiotelephone can communicate with a radio base station of which some communication channels are still vacant as far as respective service areas of more than 2 radio base stations considerably overlap each other. It is not necessary that respective service areas of radio base stations coincide with each other.

What is claimed is:

1. A communication system comprising:
   at least one radio base station having voice data processing function, which can communicate with plural mobile radio terminal equipment and said radio base station being connected to a network, wherein said radio base station has call control function and protocol conversion function of converting a protocol between a network protocol and a mobile radio terminal equipment protocol;
   at least one terminal equipment having voice data processing function, which is connected to said radio base station through said network and said terminal equipment, has an interface for a telephone network and protocol conversion function of converting a protocol between a network protocol and a telephone network protocol; and
   a communication control device having call control function, which controls communications between said radio base station and said terminal equipment, wherein said communication control device is connected to said radio base station and said terminal equipment through said network, and wherein said communication control device includes communication control means for managing a communication path between said radio base station and said terminal equipment, and wherein said radio base station and said terminal equipment transmits and receives a voice data respectively between them through said network when a communication path between said radio base station and said terminal equipment is established, and wherein said voice data transmitted between said radio base station and said terminal equipment does not pass through said communication control device.

2. A communication system in accordance with claim 1, wherein data communication protocol conversion means for transmitting and receiving computer data other than voice data are provided for said radio base station and said other terminal equipment.

3. A communication system in accordance with claim 1, wherein said other terminal equipment is another radio base station having voice data processing function which can communicate with plural mobile radio terminal equipment other than said plural mobile radio terminal equipment communicating with said radio base station.

4. A communication system in accordance with claim 3, wherein data communication protocol conversion means for transmitting and receiving computer data other than voice data are provided for said radio base station and said other terminal equipment.

5. A communication system comprising:
   at least one radio base station having voice data processing function, which can communicate with plural mobile radio terminal equipment and said radio base station being connected to a network, wherein said radio base station has call control function and protocol conversion function of converting a protocol between a network protocol and a mobile radio terminal equipment protocol; and
   a communication control device having call control function, which controls communications between said radio base station and other terminal equipment having voice data processing function connected to said network, wherein said communication control device is connected to said radio base station through said network and said communication control device directs said radio base station to carry out call control, and wherein said communication control device includes communication control means for managing a communication path between said radio base station and said other terminal equipment, and wherein said radio base station and said other terminal equipment transmits and receives a voice data respectively between them through said network when a communication path between said radio base station and said other terminal equipment is established, and wherein said voice data transmitted between said radio base station and said other terminal equipment does not pass through said communication control device.

6. A communication system in accordance with claim 5, wherein data communication protocol conversion means for transmitting and receiving computer data other than voice data are provided for said radio base station and said terminal equipment.

7. A communication system comprising:
   at least one radio base station having voice data processing function, which can communicate with plural mobile radio terminal equipment and said radio base station is connected to a network, wherein said radio base station includes first call control means for controlling calls and protocol conversion function of converting a protocol between a network protocol and a mobile radio terminal equipment protocol;

at least one analog circuit terminal equipment, which is connected to said radio base station through said network and said analog circuit terminal equipment, has an interface for an analog telephone network and protocol conversion function of converting a protocol between the network protocol and an analog telephone network protocol, wherein said analog circuit terminal equipment includes second call control means for controlling calls;

a communication control device having call control function, which is connected to said radio base station and said analog circuit terminal equipment through said network, wherein said communication control device includes communication control means for managing a communication path between said radio base station and said analog circuit terminal equipment, and wherein said radio base station and said analog circuit terminal equipment transmits and receives a voice data respectively between them through said network when a communication path between said radio base station and said analog circuit terminal equipment is established, and wherein said voice data transmitted between said radio base station and said analog circuit terminal equipment does not pass through said communication control device; and voice data processor means for communicating between said radio base station and said analog circuit terminal equipment.

8. A communication system in accordance with claim 7, wherein data communication protocol conversion means for transmitting and receiving computer data other than voice data are provided for said radio base station and said analog circuit terminal equipment.

9. A communication system comprising:

at least one radio base station having voice data processing function, which can communicate with plural mobile radio terminal equipment and said radio base station, is connected to a network, wherein said radio base station includes first call control means for controlling calls and protocol function of converting a protocol between the network protocol and a mobile radio terminal equipment protocol;

at least one ISDN terminal equipment, which is connected to said radio base station through said network and said ISDN terminal equipment has an interface for an ISDN network, wherein said ISDN terminal equipment includes second call control means for controlling calls and protocol conversion function of converting a protocol between the network protocol and the ISDN network protocol and the ISDN protocol;

a communication control device having call control function, which is connected to said radio base station and said ISDN terminal equipment through said network, wherein said communication control device includes communication control means for managing a communication path between said radio base station and said ISDN terminal equipment, and wherein said radio base station and said ISDN terminal equipment transmits and receives a voice data respectively between them through said network when a communication path between said radio base station and said ISDN terminal equipment is established, and wherein said voice data transmitted between said radio base station and said ISDN terminal equipment does not pass through said communication control device; and voice data processor means for communicating between said radio base station and said ISDN terminal equipment.

10. A communication system in accordance with claim 9, wherein data communication protocol conversion means for transmitting and receiving computer data other than voice data are provided for said radio base station and said ISDN terminal equipment.

11. A communication system comprising:

at least one radio base station having voice data processing function, which can communicate with plural mobile radio terminal equipment and said radio base station is connected to a network, wherein said radio base station includes first call control means for controlling calls and protocol conversion function of converting a protocol between the network protocol and a mobile radio terminal equipment protocol;

at least one analog circuit terminal equipment, which is connected to said radio base station through said network and said analog circuit terminal equipment, has an interface for an analog telephone network and protocol conversion function of converting a protocol between a network protocol and an analog telephone network protocol, wherein said analog circuit terminal equipment includes second call control means for controlling calls;

at least one ISDN terminal equipment which is connected to said radio base station and said analog circuit terminal equipment through said network, and said ISDN terminal equipment has an interface for an ISDN network, wherein said ISDN terminal equipment includes third call control means for controlling calls and protocol conversion function of converting a protocol between the network protocol and the ISDN protocol;

a communication control device having call control function, which is connected to said radio base station and said analog circuit terminal equipment and said ISDN terminal equipment through said network, wherein said communication control device includes communication control means for managing a communication path among said radio base station and said analog circuit terminal equipment and said ISDN terminal equipment, and wherein said radio base station and said analog circuit terminal equipment and said ISDN terminal equipment transmits and receives a voice data respectively among them through said network when a communication path among said radio base station and said analog circuit terminal equipment and said ISDN terminal equipment is established, and wherein said voice data transmitted among said radio base station and said analog circuit terminal equipment and said ISDN terminal equipment does not pass through said communication control device; and voice data processor means for communicating among said radio base station and said analog circuit terminal equipment and said ISDN terminal equipment.

12. A communication system in accordance with claim 11, wherein data communication protocol conversion means for transmitting and receiving computer data other than voice data are provided for said radio base station and said analog circuit terminal and said ISDN terminal equipment.

* * * * *